Figure 1:
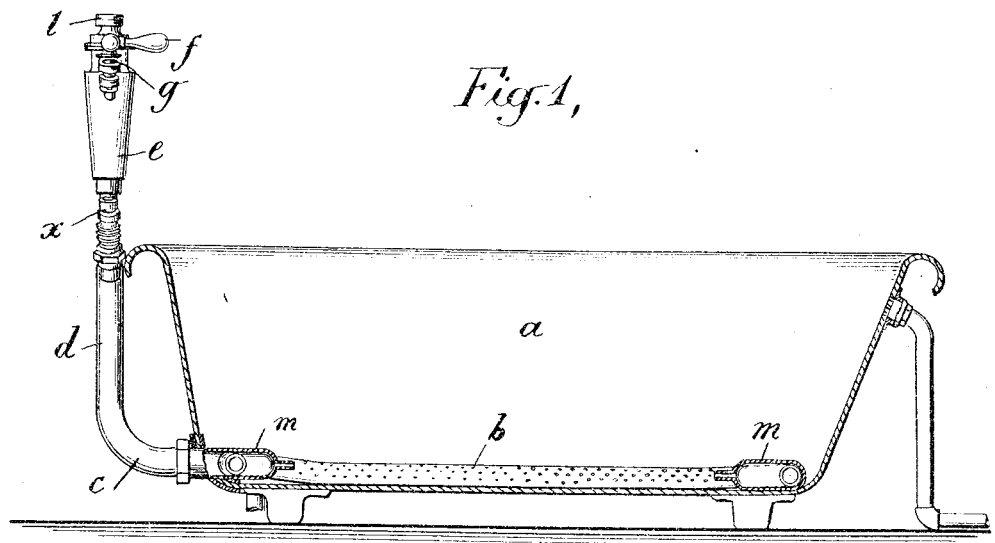

A. W. LEUSCHNER.
PRODUCTION OF AERATED BATHS.
APPLICATION FILED APR. 27, 1911.

1,034,919.

Patented Aug. 6, 1912.
2 SHEETS—SHEET 1.

WITNESSES:
C. H. Weber
L. Hauerstein

INVENTOR:
Andreas Wilhelm Leuschner,
BY
Flemmie & Goldsborough
ATTORNEYS

A. W. LEUSCHNER.
PRODUCTION OF AERATED BATHS.
APPLICATION FILED APR. 27, 1911.

1,034,919.

Patented Aug. 6, 1912.
2 SHEETS—SHEET 2.

WITNESSES:

INVENTOR:
Andreas Walther Leuschner
BY
ATTORNEYS

UNITED STATES PATENT OFFICE.

ANDREAS WALTHER LEUSCHNER, OF DRESDEN-ALT, GERMANY, ASSIGNOR TO CHRISTIAN H. WEBER, OF NEW YORK, N. Y.

PRODUCTION OF AERATED BATHS.

1,034,919.  Specification of Letters Patent.  Patented Aug. 6, 1912.

Application filed April 27, 1911. Serial No. 623,560.

*To all whom it may concern:*

Be it known that I, ANDREAS WALTHER LEUSCHNER, a subject of the Emperor of Germany, residing at Dresden-Alt, Saxony, Germany, have invented certain new and useful Improvements in Production of Aerated Baths; and I do hereby declare the following to be a full, clear, and exact description of the invention, such as will enable others skilled in the art to which it appertains to make and use the same.

This invention relates to certain new and useful improvements in the production of aerated or air bubble baths which have been found of value for the treatment of certain nervous maladies and which are particularly invigorating for weakly and convalescent persons.

The essential novelty of the invention consists in means for introducing the air into the bath with the in-flowing stream of water, and in intimate admixture and fine sub-division therein.

Prior to my invention, the production of air bubble baths has been effected by first filling the bath tub with water alone and then injecting the air, that is, without preliminary admixture of the air with an incoming water current. This prior practice has the disadvantage that the air does not enter the water of the bath tub in fine bead-like sub-division nor intimately admixed with the water, but issues from the exit openings of the air admission pipe in the form of larger air bubbles which do not enter into contact with the body of the bather in a directly effective and invigorating manner.

The purpose of the present invention is to overcome this disadvantage, and it consists in intimately admixing the air with the water on its way into the bath tub and in bringing it into an extremely fine state of sub-division in the latter. For this purpose, the air is drawn in by means of a water jet injector, is intimately admixed with the water of the water jet, and then, together therewith, is introduced in the finest state of sub-division into the bath tub which has already been filled to the desired level with water. The introduction of the mixture of air and water into the bath tub takes place preferably by means of an oval shaped pipe ring adapted to rest on the bottom of the bath tub, and having a series of perforations from which the mixture of water and air as it issues into the bath communicates itself to the entire body of water therein in a state of the finest sub-division, so that an extremely intensive action of the air bubbles or bead-like air particles is exerted upon the entire body of the bather. Simultaneously, the necessary amount of warm water for tempering the mixture of cold water and air is admitted, preferably below the injector jet and the cold mixture of water and air is immediately mixed with the warm water in such manner that, by reason of this further commingling with the warm water, a still more intimate admixture and finer sub-division of the air in the water takes place.

The perforated pipe ring serving for the introduction of the mixture of water and air into the bath tub, filled with water, and which pipe ring lies upon the bottom of the bath tub is provided at the place where the mixture enters, as well as at the opposite portion of the ring, with sack-like extensions, perforated at their free ends. These sack-like extensions are provided for the purpose of preventing stagnation of the mixture of water and air and have the function of causing a vortical motion and further admixing action in the water and air mixture as it passes through them. They also serve to avoid water-hammer, and insure the proper distribution of the mixture of water and air to the apertures of the bottom ring so that it will issue uniformly and with practically equal force throughout the entire series of apertures.

Figure 2:
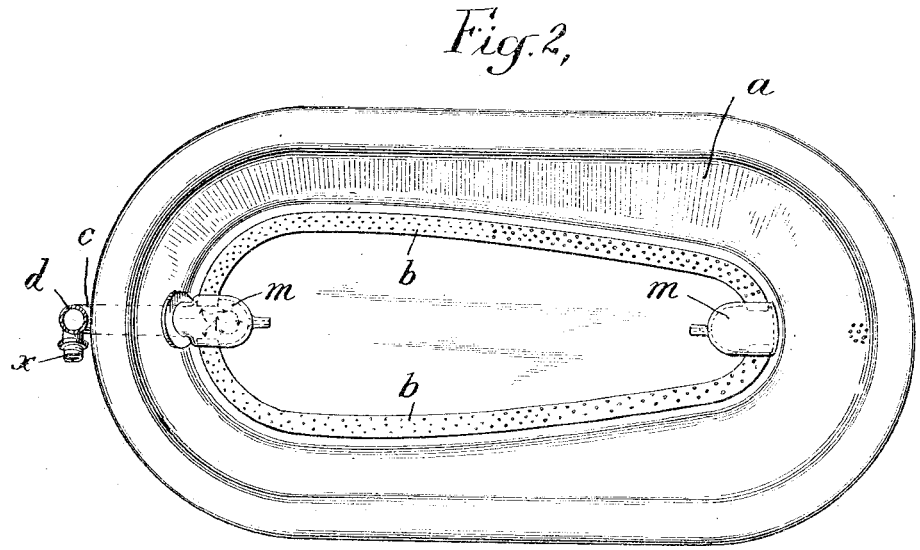
Figure 3:
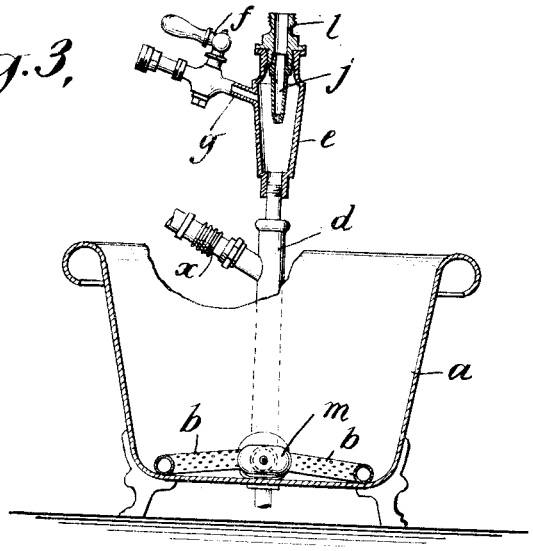
Figure 4:
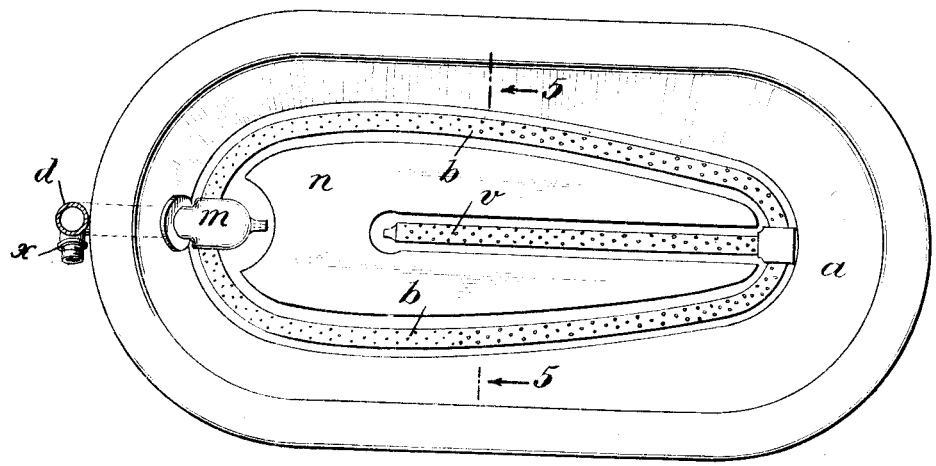
Figure 5:
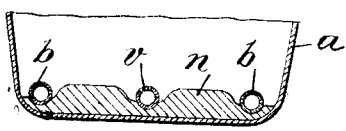

The apparatus employed in the practice of the invention is illustrated in the accompanying drawing wherein;

Figure 1 represents a sectional view of a bath tub equipped with the invention; Fig. 2 represents a cross sectional view thereof, partly in elevation; Fig. 3 represents a bottom plan view; and Figs. 4 and 5 represent, in plan and in cross section, a modification of the bottom ring.

Similar letters of reference indicate similar parts throughout the several views.

Referring to the drawings, *a* indicates a bath tub, which may be provided with the usual overflow devices, discharge openings and the like. The bottom ring *b* is preferably of oval form and is adapted to rest upon the bottom of the bath tub, as shown in Figs. 1 and 2; or, if provided with a central pipe $v$, it may be set within countersunk recesses of a wooden bottom $n$, as shown in Figs. 4 and 5. The bottom ring is provided with a series of apertures, as shown, the apertures on the inner sides of the ring being directed downwardly and inwardly and the apertures on the upper side of the ring being directed upwardly and being of slightly larger size than the lower apertures. The bottom ring connects by an elbow $c$ with a down-take $d$, which may be integral therewith. At the upper part of the upright $d$ is arranged the housing $e$, which is provided with a side branch $g$ having a cut-off cock or valve $f$. The pipe $g$ is intended to admit air into the housing $e$, under the injecting influence of the injector jet $j$ which communicates with the cold water supply pipe $l$.

It will be found suitable to make the openings that are in that half of the oval pipe which is adjacent to the down-take $d$ and elbow $c$ of about ¾ mm. bore and to make the openings in the other half of the oval pipe from 1 mm. to 1¼ mm. bore. It is also recommended to space the openings about 1 cm. to 1½ cm. apart for the best effects.

The pressure of the water injecting jet will conveniently be about three atmospheres but may exceed that amount if desired.

In order to temper the mixture of cold water and air on its way to the bottom ring, a supply pipe $x$ is provided for the admission of warm water. The entrance of this warm water supply further assists in effecting the intimate admixture of the air with the water column on its way to the bath tub, and this intimate admixture is further insured by the extensions $m$, which have small openings at their outer ends and which are arranged respectively at opposite extremities of the oval bottom ring, the water and air mixture finding free entrance into these extensions and being subjected therein to a vortical action and further mixing effect.

Having thus described my invention, what I claim is:

1. Apparatus for producing bead-like aerations in baths, consisting of a bath tub, a perforated pipe lying in the bottom of the bath tub, a water supply pipe communicating with the bottom pipe, a water jet injector leading into the water supply pipe, a warm water pipe leading into the said water supply pipe, and an air pipe through which air is drawn by the water jet injector into the water supply pipe; substantially as described.

2. Apparatus for producing bead-like aerations in baths, consisting of a bath tub, a perforated pipe lying in the bottom of the bath tub, a water supply pipe communicating with the bottom pipe, a water jet injector leading into the water supply pipe and an air pipe through which air is drawn by the water jet injector into the water supply pipe, the perforated pipe being of oval form and being provided at opposite points with sack-like extensions; substantially as described.

In testimony whereof I affix my signature, in presence of two witnesses.

ANDREAS WALTHER LEUSCHNER.

Witnesses:
PAUL ARRAS,
ARTHUR GUBE.